Figure 1:
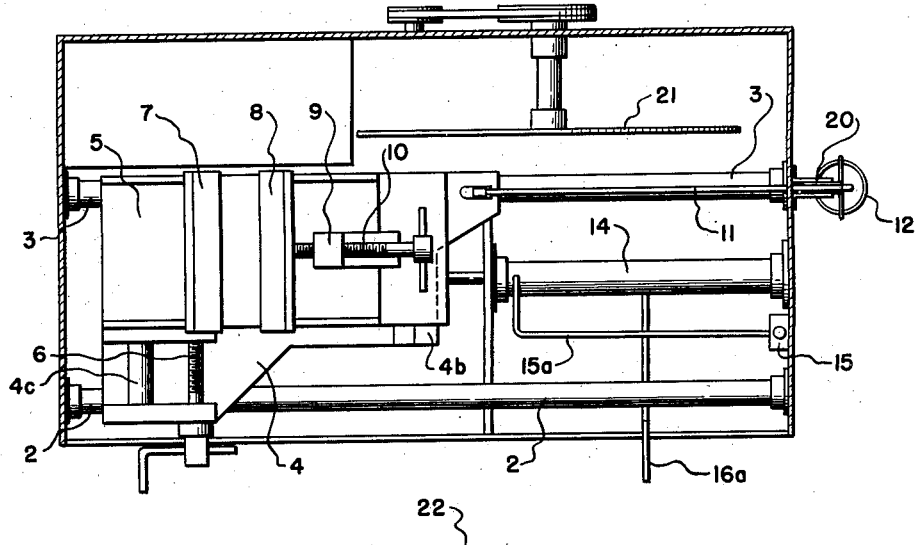

Dec. 13, 1949  W. H. HUNT ET AL  2,491,047
FEED CONTROL FOR STONE CUTTING MACHINES
Filed June 7, 1947                2 Sheets-Sheet 1

INVENTORS
WILLIAM H. HUNT &
GEORGE L. RITCHIE
BY
*Wm H. Dean*
AGENT

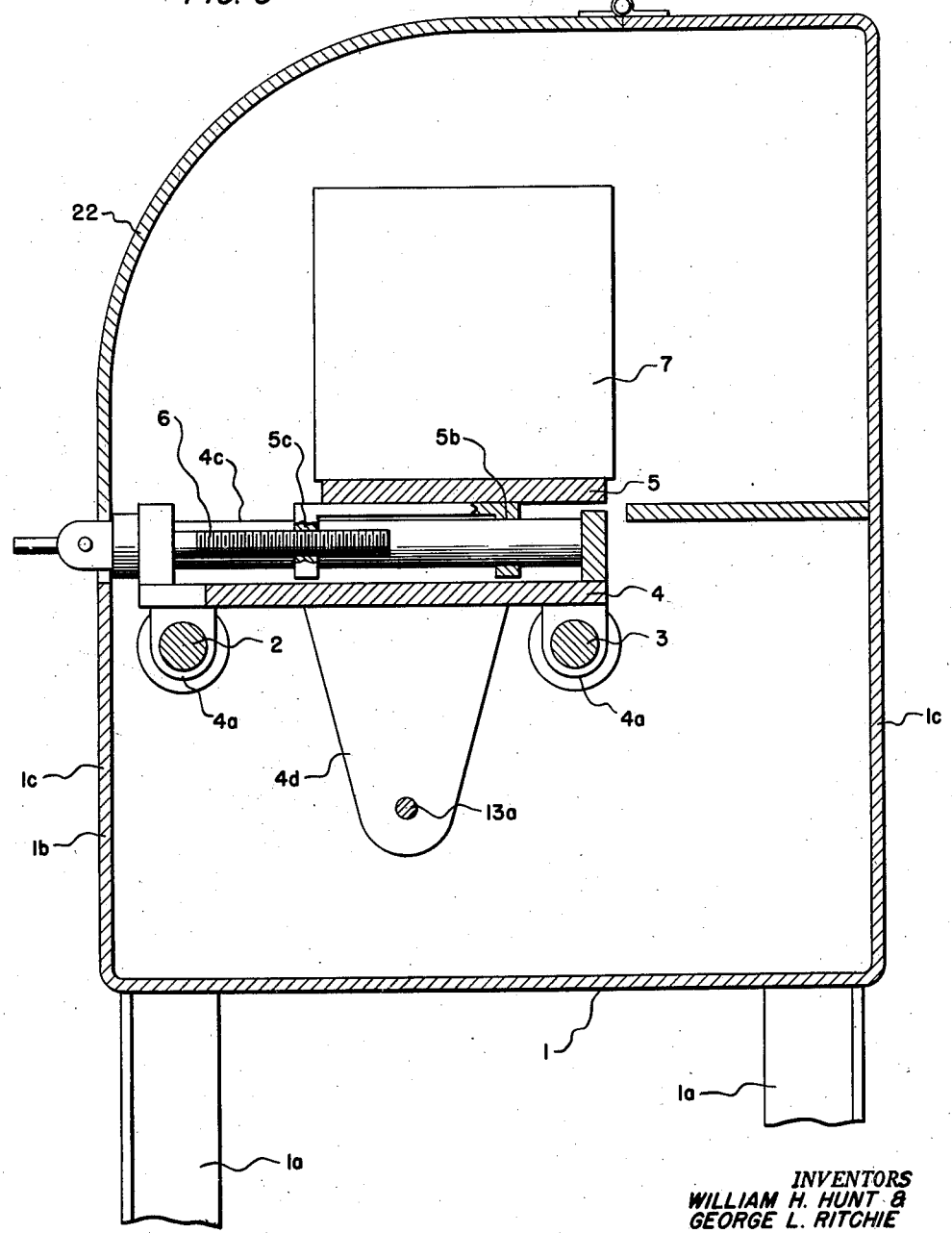

Patented Dec. 13, 1949

2,491,047

UNITED STATES PATENT OFFICE 2,491,047

FEED CONTROL FOR STONE CUTTING MACHINES

William H. Hunt, National City, and George L. Ritchie, Chula Vista, Calif.

Application June 7, 1947, Serial No. 753,196

5 Claims. (Cl. 125—13).

Our invention relates to a feed control for stone cutting machines and the objects of our invention are:

First, to provide a feed control of this class which automatically regulates the carriage speed relatively to the saw of the machine regardless of the cross sectional area of material being cut.

Second, to provide a control of this class which prevents undue pressure of the material being cut at the cutting edge of the saw when the saw approaches the edge of the material which is considerably reduced in cross section thereby preventing breakage of the material being cut due to excessive pressure thereon greater than the strength of the material.

Third, to provide a control of this class which prevents the remaining sections of the stones and the like from breaking and jamming the remaining portions thereof against the saw blade of the cutting machine thereby reducing hazard to the saw.

Fourth, to provide a control of this class in which a weight is employed to actuate the carriage past the saw providing a variable speed feed of the carriage past the saw in accordance with the varying cross sectional area of stones or other objects being cut whereby the saw is only required to operate at a certain capacity.

Fifth, to provide a control of this class in which a weight actuated carriage is restrained by a hydraulic bleeder valve operating in conjunction with a piston and plunger which prevents acceleration of the carriage when the cross sectional area of the stone being cut is reduced by the saw.

Sixth, to provide a control of this class which improves generally the continuity of cutting on the surfaces of stones providing a smoother surface throughout the entire cross section of the stone thus reducing the labor required to finish the surface after it is sawed.

Seventh, to provide a stone cutting machine of this class which may be operated after being started without attention of the operator.

Eighth, to provide a stone cutting machine of this class which substantially eliminates the hazard of breaking valuable gems and ruining expensive saw blades in the operation of cutting such gems.

Ninth, to provide a stone cutting machine of this class which is very simple and economical of construction, efficient in operation, and which will not readily deteriorate or get out of order.

Figure 2:
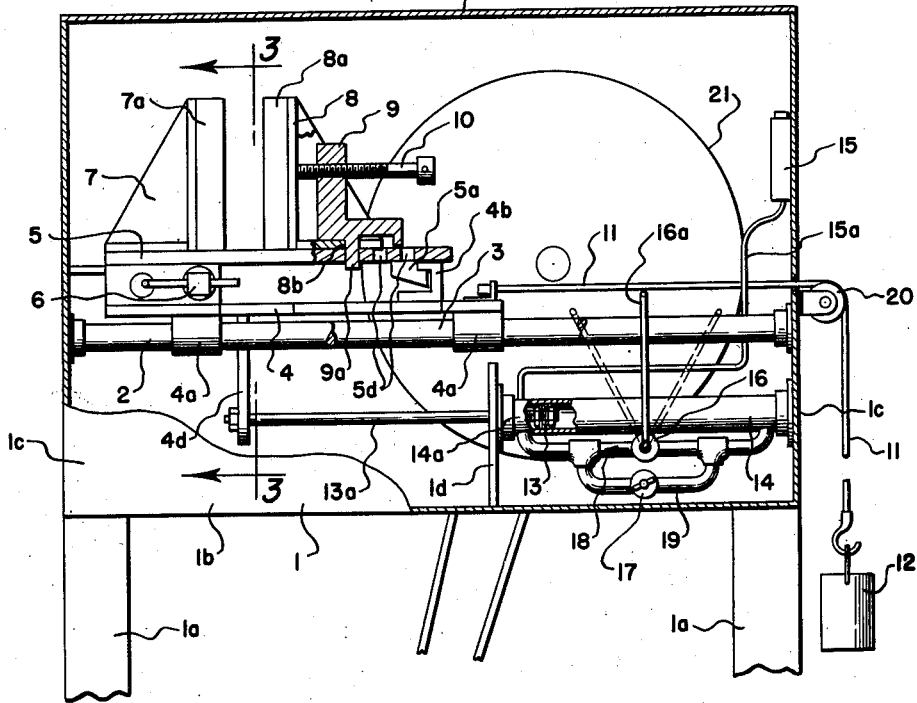

With these and other objects in view, as will appear hereinafter, our invention consists of certain novel features of construction, combination and arrangement of parts and portions as will be hereinafter described in detail and particularly set forth in the appended claims, reference being had to the accompanying drawing and to the characters of reference thereon forming a part of this application in which:

Figure 1 is a top or plan view of our feed control for stone cutting machines showing the cover of the machine in section. Figure 2 is a side elevational view thereof showing portions broken away and in section to amplify the illustration and showing portions fragmentarily, and Figure 3 is a fragmentary sectional view taken from the line 3—3 of Figure 2 showing the structure on an enlarged scale.

Similar characters of reference refer to similar parts and portions throughout the several views of the drawings.

The frame 1, ways members 2 and 3, main carriage 4, cross feed carriage 5, cross feed screw 6, jaws 7 and 8, dog 9, screw 10, cable 11, weight 12, plunger 13, cylinder 14, reservoir 15, valves 16 and 17, tubes 18 and 19, pulley 20, saw 21, and hood 22 constitute the principal parts and portions of our feed control for stone cutting machines.

As shown in Figure 2 of the drawings the frame 1 is provided with legs 1—a and a box shaped sump portion 1—b having substantially vertically extending side walls 1—c. Secured to the side walls 1—c are the ways members 2 and 3 which are substantially circular in cross section rods on which the main carriage 4 is slidably mounted by means of bearings 4—a as shown in Figures 2 and 3 of the drawings. Transversely slidably mounted on the main carriage 4 is the cross feed carriage 5. This cross feed carriage 5 is provided with ways bearings 5—a and 5—b engaging the ways 4—b and the ways rod 4—c respectively as shown best in Figures 2 and 3 of the drawings. The cross feed screw 6 is longitudinally revolubly limited in connection with the main carriage 4 and is screw threaded in the nut 5—c of the cross feed carriage 5 for actuating the cross feed carriage 5 transversely of the main carriage 4. Mounted on the cross feed carriage 5 is the stationary jaw 7 having a soft block 7—a arranged to engage various articles placed thereagainst. In opposed relation to the stationary jaw 7 is the jaw 8 having soft pad 8—a preferably made of wood or the like similar to the pad 7—a of the jaw 7. This jaw 8 is provided with an opening 8—b in the base thereof adapted to align with the openings 5—d in the cross feed carriage 5. The dog 9 is provided with a protruding portion 9—a adapted to extend through the openings 8—b and 5—d for initially setting the spaced relationship of the jaw 8 relatively to the jaw 7. The screw 10 engages the jaw 8 at the rear side thereof and is longitudinally screw threaded in the dog 9 to provide final adjustment of the jaw 8 relatively to the jaw 7 for clamping stones or gems therebetween. It will be here noted that the opening 8—b in the jaw 8 is elongated so that it is slidable relatively to the projection 9—a of the dog 9 permitting movability of the jaw 8 relatively to the dog 9 after said dog 9 is set in connection with the cross feed carriage 5. Extending downwardly from the main carriage 4 is an arm 4—d to which the shaft 13—a of the plunger 13 is secured.

The plunger 13 as shown in Figure 2 of the drawings is reciprocally mounted in the cylinder 14 which is stationarily mounted in connection with the frame 1 intermediate one of the side walls 1—c thereof and the upwardly extending plate 1—d secured in the sump portion 1—b of said frame 1. Communicating with the end portion 14—a of the cylinder 14 through which the shaft 13—a of the plunger 13 extends is the tube 15—a connected to the elevated reservoir 15. The tube 18 as shown in Figure 2 of the drawings communicates with opposite ends of the cylinder 14 and opposite sides of the plunger 13 therein. Intermediate opposite ends of this tube 18 is the manually controlled shut off valve 16 operated by means of the handle 16—a extending to an elevated position at the side of the frame 1 in convenient position. By-passing the shut-off valve 16 is the tube 19 having a relief valve 17 therein. This relief valve 17 is an adjustable bleeder for the cylinder 14 and provides a by-pass for the fluid when the shut-off valve 16 is closed. Connected with the main carriage 4 is the cable 11 which extends to the end of the frame 1 and passes downwardly over the pulley 20 stationarily connected to the frame 1. Secured on the normally lower end of the cable 11 is the weight 12 which by its gravitational tendency forces the carriage 4 to slide on the ways members 2 and 3 in accordance with the speed at which the fluid bleeds through the valve 17 from the cylinder 14 at one side of the plunger 13.

The operation of our feed control for stone cutting machines is substantially as follows:

When a stone or gem is clamped between the jaws 8 and 9 and the saw 21 is rotating the manual shut off valve 16 is opened and the carriage is gently moved to a position placing the gem near the wheel 21. Then the valve 16 is closed which is accomplished by the handle 16—a. The cross feed carriage 5 is in position to pass the stone or gem by the blade 21 for cutting a portion of the stone or gem from the main piece. Lateral adjustment of the cross feed carriage is accomplished by means of the cross feed screw 6 in a screw threaded relation with the nut 5—c of the cross feed carriage 5. The weight 12 in connection with the cable 11 tends to force the main carriage 4 longitudinally of the ways members 2 and 3 toward the saw 21. As the stone between the jaws 7 and 8 engages the saw 21 it cuts relatively fast until the cross sectional area of the cut increases due to penetration in the saw blade in the stone or gem. This speed, however, is controlled by the constant bleeding of fluid from the cylinder 14 through the relief valve 17 which is adjustable. Thus, the carriage 4 cannot proceed past the saw 21 at any speed greater than that permitted by the bleeding of fluid through the relief valve 17. As the middle portion of the stone or gem is reached the weight 12 remains constant and therefore undue pressure of the stone on the saw is obviated. As the saw reaches the opposite side of the stone or gem the cross sectional area thereof is decreased and again the fluid bleeding through the valve 17 prevents the weight 12 from actuating the carriage 4 at excessive speed. Thus, the saw 21 is able to cut away the material of the stone or gem very smoothly without imposing undue stresses on the small remaining cross sectional area of the stone or gem which permits the same to be cut smoothly to the extremities thereof without hazard of breakage and without hazard of jamming the saw blade 21 and damaging the same. Thus, it is obvious that the controlling arrangement of the gravity actuated carriage by the plunger 13 in the hydraulic cylinder 14 is definitely superior to a constant speed feed or to a feed which is entirely gravity actuated. In a lead screw feed, for example, the saw 21 must proceed through the stone or gem at a certain longitudinal rate regardless of the cross sectional area thereof which over-burdens the saw. This is entirely obviated by our feed control. The other arrangement using the gravity actuated carriage alone permits the gravitational weight to crowd the reduced cross sectional area of a stone against the saw blade 21 causing breakage thereof and jamming of the saw which damages the saw. To anyone skilled in the art of stone cutting, it is well known that the initial cut which is smooth requires less labor to surface. This is another advantage in the operation of our feed control for stone cutting machines. If desired, a stone may be placed between the jaws 7 and 8 and the machine may be started as hereinbefore described and left to finish the cut without paying any attention to the approach of the saw at the extremities of the stone being cut. This saves much time of the operator who is able to do other stone finishing jobs while the machine is operating.

It will be here noted that reciprocation of the plunger shaft 13—a in the cylinder 14 displaces a certain amount of fluid which is not accounted for in the opposite end of the cylinder 14. Therefore the reservoir 15 supplies this discrepancy with each reciprocal movement of the plunger 13.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a cutting machine the combination of a saw, a carriage movable relative to said saw having holding jaws in connection therewith, a cable in connection with said carriage, a gravitational weight in connection with said cable actuating said carriage relatively to said saw, a stationarily mounted cylinder, a plunger in said cylinder connected with said carriage and a bleeder valve communicating with opposite ends of said cylinder for hydraulically controlling the speed of said carriage urged by said gravitational weight, a shut-off valve communicating with opposite ends of said cylinder arranged to by-pass said bleeder valve permitting free movement of said carriage.

2. In a cutting machine the combination of a saw, a carriage movable relative to said saw having holding jaws in connection therewith, a cable in connection with said carriage, a gravitational weight in connection with said cable actuating said carriage relatively to said saw, a stationarily mounted cylinder, a plunger in said cylinder connected with said carriage and a bleeder valve communicating with opposite ends of said cylinder for hydraulically controlling the speed of said carriage urged by said gravitational weight, a shut-off valve communicating with opposite ends of said cylinder arranged to bypass said bleeder valve permitting free movement of said carriage, a manual control in connection with said shut-off valve.

3. In a stone cutting machine of the class described, combination of a saw blade, a movable carriage adapted to pass said saw blade arranged to support articles thereon in interfering relation with the edge of said saw blade, gravitational weight means in connection with said carriage arranged to force the same past said saw blade, a hydraulic plunger in connection with said carriage, a cylinder in which said plunger is reciprocally mounted, and a bleeder valve directly communicating with opposite ends of said cylinder for slowly bleeding the fluid from one side of said plunger to the opposite side thereof resisting the actuation of said carriage urged by said gravitational weight means a second valve communicating with opposite ends of said cylinder, arranged to bypass said bleeder valve, permitting movement of said carriage in the opposite direction from that urged by said gravitational weight means.

4. In a stone cutting machine of the class described, combination of a saw blade, movable carriage adapted to pass said saw blade arranged to support articles thereon in interfering relation with the edge of said saw blade, gravitational weight means in connection with said carriage arranged to force the same past said saw blade, a hydraulic plunger in connection with said carriage, a cylinder in which said plunger is reciprocally mounted, and a bleeder valve directly communicating with opposite ends of said cylinder for slowly bleeding the fluid from one side of said plunger to the opposite side thereof resisting the actuation of said carriage urged by said gravitational weight means, a manual shut-off valve communicating with opposite ends of said cylinder arranged to bypass said bleeder valve permitting free movement of said carriage relatively to said saw blade.

5. In a stone cutting machine of the class described, combination of a saw blade, movable carriage adapted to pass said saw blade arranged to support articles thereon in interfering relation with the edge of said saw blade, gravitational weight means in connection with said carriage arranged to force the same past said saw blade, a hydraulic plunger in connection with said carriage, a cylinder in which said plunger is reciprocally mounted, and a bleeder valve communicating with opposite ends of said cylinder for slowly bleeding the fluid from one side of said plunger to the opposite side thereof resisting the actuation of said carriage urged by said gravitational weight means, a manual shut-off valve communicating with opposite ends of said cylinder arranged to bypass said bleeder valve permitting free movement of said carriage relatively to said saw blade, an elevated reservoir communicating with one end of said cylinder at which said plunger enters the same for supplying fluid to the cylinder displaced by the plunger shaft.

WILLIAM H. HUNT.
GEORGE L. RITCHIE.

REFERENCES CITED

The following references are of record in the file of this patent:

UNITED STATES PATENTS

| Number | Name | Date |
|---|---|---|
| 1,261,669 | Wright | Apr. 2, 1918 |
| 1,976,164 | Fitton et al. | Oct. 9, 1934 |
| 2,254,046 | Pearson | Aug. 26, 1941 |
| 2,308,703 | McCain | Jan. 19, 1943 |
| 2,354,509 | Dreher | July 25, 1944 |
| 2,371,085 | Waters | Mar. 6, 1945 |
| 2,382,897 | Muller | Aug. 14, 1945 |
| 2,431,469 | Eyles | Nov. 25, 1947 |